(12) United States Patent
Evesti et al.

(10) Patent No.: US 11,394,737 B2
(45) Date of Patent: Jul. 19, 2022

(54) TRUSTWORTHY CLOUD-BASED SMART SPACE RATING WITH DISTRIBUTED DATA COLLECTION

(71) Applicant: PCMS Holdings, Inc., Wilmington, DE (US)

(72) Inventors: Antti V. P. Evesti, Oulu (FI); Pia E. Raitio, Oulu (FI); Pekka P. Savolainen, Oulu (FI)

(73) Assignee: PCMS Holdings, Inc., Wilmington, DE (US)

( * ) Notice: Subject to any disclaimer, the term of this patent is extended or adjusted under 35 U.S.C. 154(b) by 204 days.

(21) Appl. No.: 15/753,507

(22) PCT Filed: Aug. 22, 2016

(86) PCT No.: PCT/US2016/048039
§ 371 (c)(1),
(2) Date: Feb. 19, 2018

(87) PCT Pub. No.: WO2017/035074
PCT Pub. Date: Mar. 2, 2017

(65) Prior Publication Data
US 2018/0241766 A1    Aug. 23, 2018

Related U.S. Application Data

(60) Provisional application No. 62/210,470, filed on Aug. 27, 2015.

(51) Int. Cl.
*H04L 29/06* (2006.01)
*H04L 9/40* (2022.01)
(Continued)

(52) U.S. Cl.
CPC ........ *H04L 63/1433* (2013.01); *G06F 21/577* (2013.01); *H04L 63/20* (2013.01);
(Continued)

(58) Field of Classification Search
CPC .. H04L 63/1433; H04L 63/20; H04W 12/128; H04W 12/10; H04W 12/67; G06F 21/577
See application file for complete search history.

(56) References Cited

U.S. PATENT DOCUMENTS 8,181,253 B1 *  5/2012  Zaitsev  ............... H04L 63/1433
                                                        726/25
8,590,014 B1 * 11/2013  Haugsnes ............... G06F 21/31
                                                         726/3

(Continued)

OTHER PUBLICATIONS

Bri, https://en.wikipedia.org/w/index.php?title=IEEE_802.11&oldid=676756183, Aug. 6, 2015 (Year: 2015).*

(Continued)

*Primary Examiner* — Taghi T Arani
*Assistant Examiner* — Lin Chang
(74) *Attorney, Agent, or Firm* — Invention Mine LLC

(57) ABSTRACT

A method, apparatus, and system for a smart space rating service (106) are provided. A method includes receiving, from a user device (104a, 104b), a request for a security rating of a smart space (102), calculating the security rating of the smart space (102) based at least in part on security information regarding the smart space (102), the security information received from a plurality of user devices (104a, 104b), and transmitting the security rating of the smart space (102) to the user device (104a, 104b).

27 Claims, 9 Drawing Sheets

(51) Int. Cl.
  *G06F 21/57* (2013.01)
  *H04W 12/128* (2021.01)
  *H04W 12/10* (2021.01)
  *H04W 12/67* (2021.01)

(52) U.S. Cl.
  CPC ......... *H04W 12/10* (2013.01); *H04W 12/128* (2021.01); *H04W 12/67* (2021.01)

(56) References Cited

U.S. PATENT DOCUMENTS

| | | | | |
|---|---|---|---|---|
| 8,769,130 | B1* | 7/2014 | Chang | H04L 12/6418 709/229 |
| 9,076,013 | B1 | 7/2015 | Bailey, Jr. | |
| 2002/0147803 | A1* | 10/2002 | Dodd | G06F 21/577 709/223 |
| 2006/0236104 | A1* | 10/2006 | Wong | G06F 21/6227 713/168 |
| 2008/0084294 | A1* | 4/2008 | Zhiying | H04W 4/70 340/539.22 |
| 2009/0007246 | A1* | 1/2009 | Gutowski | H04L 63/20 726/6 |
| 2010/0005518 | A1* | 1/2010 | Tirpak | H04L 67/306 726/6 |
| 2011/0208866 | A1* | 8/2011 | Marmolejo-Meillon | H04L 63/0823 709/227 |
| 2011/0302026 | A1* | 12/2011 | Kanakarajan | H04L 67/2819 705/14.45 |
| 2012/0023588 | A1* | 1/2012 | Su | H04L 63/0236 726/26 |
| 2012/0036240 | A1* | 2/2012 | Lancaster | H04L 41/0803 709/221 |
| 2012/0110633 | A1 | 5/2012 | An | |
| 2013/0198523 | A1* | 8/2013 | Wu | G06F 21/57 713/182 |
| 2013/0267242 | A1* | 10/2013 | Curticapean | G01S 5/0242 455/456.1 |
| 2014/0071895 | A1* | 3/2014 | Bane | H04L 69/321 370/328 |
| 2014/0143833 | A1* | 5/2014 | Rajan | H04L 63/0876 726/3 |
| 2014/0156806 | A1* | 6/2014 | Karpistsenko | G06Q 50/28 709/219 |
| 2014/0207707 | A1* | 7/2014 | Na | H04L 65/1033 705/412 |
| 2014/0266669 | A1* | 9/2014 | Fadell | G06N 5/04 340/501 |
| 2015/0189511 | A1* | 7/2015 | Lapidous | H04L 63/0272 726/15 |
| 2015/0310205 | A1* | 10/2015 | Pruthi | G06F 21/46 726/25 |
| 2016/0073271 | A1* | 3/2016 | Schultz | H04W 64/003 455/404.1 |
| 2017/0199918 | A1* | 7/2017 | Nakahashi | G06F 16/24578 |

OTHER PUBLICATIONS

Trend Micro, Business Support, "Information about Trend Micro Web Reputation Services (WRS)", last updated Movember25, 2014, retrieved from https://web.archive.org/web/20150719070934/https://esupport.trendmicro.com/solution/en-us/1058991.aspx.
Wikipedia, "TrustedSource" last modified on Mar. 21, 2013, retrieved from https://en.wikipedia.org/w/index.php?title=TrustedSource&oldid=545868712.
Notification of Transmittal of the international Search Report and Written Opinion of the International Searching Authority, or Declaration for PCT/US2016/048039 dated Jan. 16, 2017.
Invitation to Pay Additional fees and, where applicable, protest fee for PCT/US2016/048039.
Notification of Transmittal of the International Preliminary Report on Patentability for PCT/US2016/048039 dated Sep. 21, 2017.

* cited by examiner

TRUSTWORTHY CLOUD-BASED SMART SPACE RATING WITH DISTRIBUTED DATA COLLECTION

The present application is a national stage application under 35 U.S.C. 371 of International Application No. PCT/US2016/048039, entitled TRUSTWORTHY CLOUD-BASED SMART SPACE RATING WITH DISTRIBUTED DATA COLLECTION, filed on Aug. 22, 2016, which claims benefit under 35 U.S.C. § 119(e) from, U.S. Provisional Patent Application Ser. No. 62/210,470, entitled TRUSTWORTHY CLOUD-BASED SMART SPACE RATING WITH DISTRIBUTED DATA COLLECTION, filed Aug. 27, 2015.

FIELD

The present invention relates to the field of wireless communications, user equipment (UE), user interfaces (UI), smart spaces (SSs), and more particularly, to methods, apparatus and systems for determining properties of smart spaces.

BACKGROUND

Home, office, local area networks (LANs), and other networks, particularly wireless networks, are becoming increasingly ubiquitous and sophisticated. Such networks may be populated with a multiplicity of electronic devices interconnected through the network. Such networks may include smart phones, computers, printers, smart televisions and other video equipment, smart appliances, smart thermostats, smart security systems, smart stereos and other audio equipment, modems for connecting to the Internet or other networks, digital storage devices, etc. The term "smart space" has been coined for networks (or portions thereof) in which a plurality of electronic devices utilize a shared view of resources and services so that, for instance, the user interface of one device in the smart space may be used to control another device in the smart space. Merely as an example, a smart refrigerator with wireless communication capabilities and an electronic user interface (e.g., a display device such as a touch screen) may be used to control other electronic devices in the smart space. Thus, for instance, the smart refrigerator may have a digital interface, such as a touch screen, on which a user may control functions of the refrigerator (e.g., setting the temperatures in the freezer and refrigerator compartments, controlling the door dispenser to selectively dispense ice cubes, crushed ice, or water, etc.) and/or perform operations related to the smart space.

End users typically use various open and public smart spaces, e.g., in a shopping mall, airport, stadium, etc. But, generally, end users are not aware of the security level provided by a public smart space and do not always use appropriate security settings when interacting with the smart space. This can result in various security incidents, including malware delivery, unlawful personal data collection, etc.

SUMMARY

Methods, apparatuses, and systems for a smart space rating server are provided. A representative method includes receiving, from a user device, a request for a security rating of a smart space, calculating the security rating of the smart space based at least in part on security information regarding the smart space, the security information received from a plurality of user devices, and transmitting the security rating of the smart space to the user device.

A representative apparatus includes a smart space rating server including a memory configured to store instructions, and a processor, by executing the instructions, configured to receive, from a user device, a request for a security rating of the smart space, calculate a security rating of the smart space based at least in part on the security information regarding the smart space, and transmit the security rating of the smart space to the user device.

A representative method performed by a user device includes detecting a first smart space and a second smart space in proximity to the user device, transmitting, to a smart space rating server, a first request for a first security rating of the first smart space and a second request for a second security rating of the second smart space, receiving the first security rating and the second security rating from the smart space rating server, and determining whether to join any of the first smart space and the second smart space based on a comparison of the first security rating and the second security rating.

A representative apparatus includes a user device including at least one transceiver, and a processor, coupled to the at least one transceiver, configured to detect a first smart space and a second smart space in proximity to the user device, transmit, to a smart space rating server, a first request for a first security rating of the first smart space and a second request for a second security rating of the second smart space, receive the first security rating and the second security rating from the smart space rating server, and determine whether to join the first smart space or the second smart space based on a comparison of the first security rating and the second security rating.

BRIEF DESCRIPTION OF THE DRAWINGS

A more detailed understanding may be had from the following description, given by way of example in conjunction with the accompanying drawings wherein.

DETAILED DESCRIPTION

Embodiments, as further described below, include systems and methods for a trustworthy smart space rating service. In an embodiment, a smart space rating service may be enabled by a crowd-sourced solution that relies on distributed data collection by end user devices. According to certain embodiments, data collection and distribution by a user device may be automatic and may not need and/or require human input and and/or may not allow human modification. According to certain embodiments, a smart space rating may be obtained by a user device directly from the smart space rating service, thereby preventing third party tampering, for example.

Figure 1:
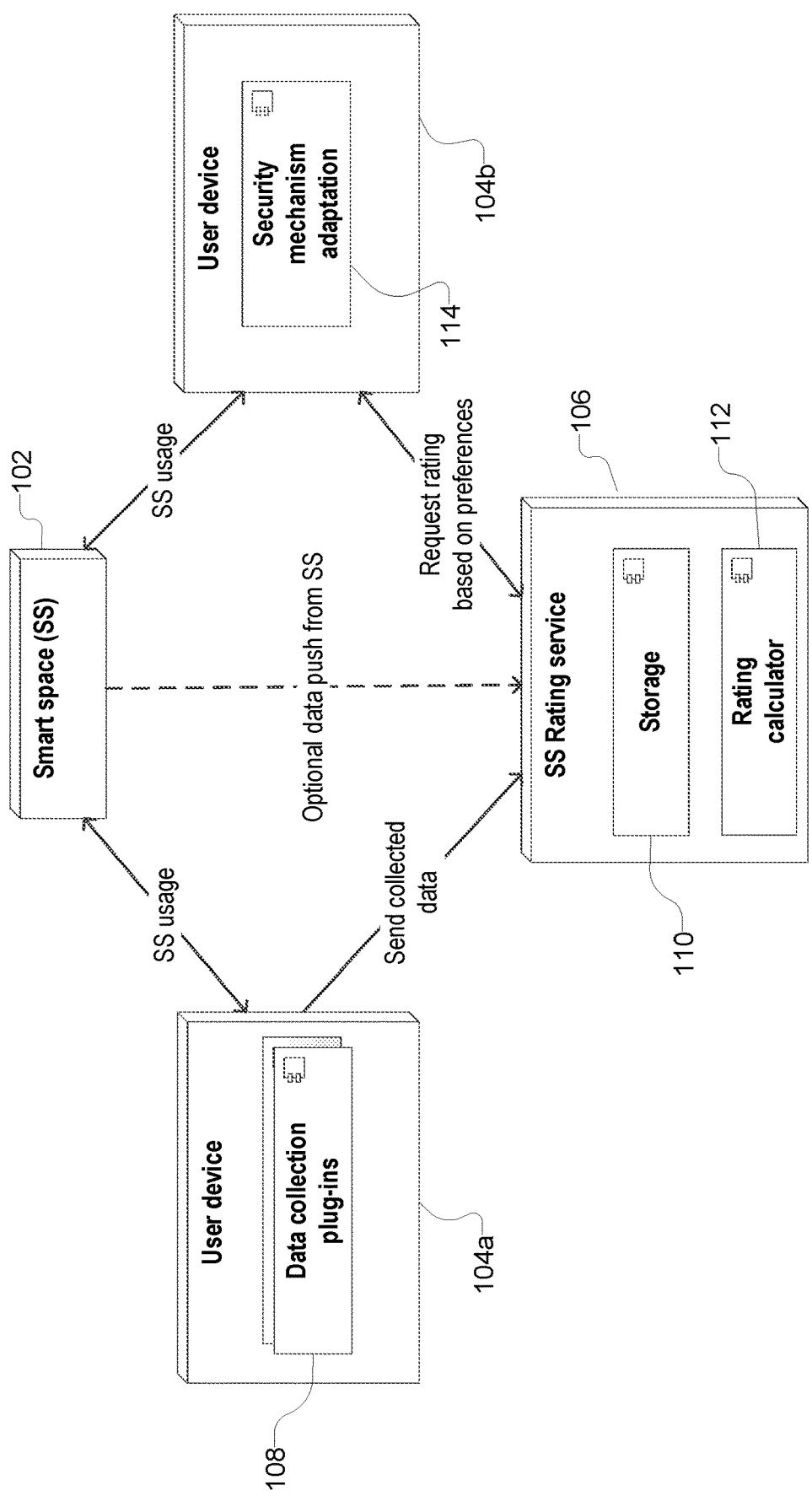
FIG. 1 illustrates an example environment according to an embodiment.

FIG. 1 illustrates an example environment 100 in which embodiments can be practiced or implemented. Example environment 100 is provided for the purpose of illustration only and is not limiting of embodiments of the present disclosure. As shown in FIG. 1, example environment 100 includes a smart space 102, a first user device 104a, a second user device 104b, and a smart space rating service 106. As would be understood by a person of skill in the art based on the teachings herein, in other embodiments, example environment 100 may include more or fewer elements, including more or fewer user devices or more smart spaces, for example.

Figure 2:
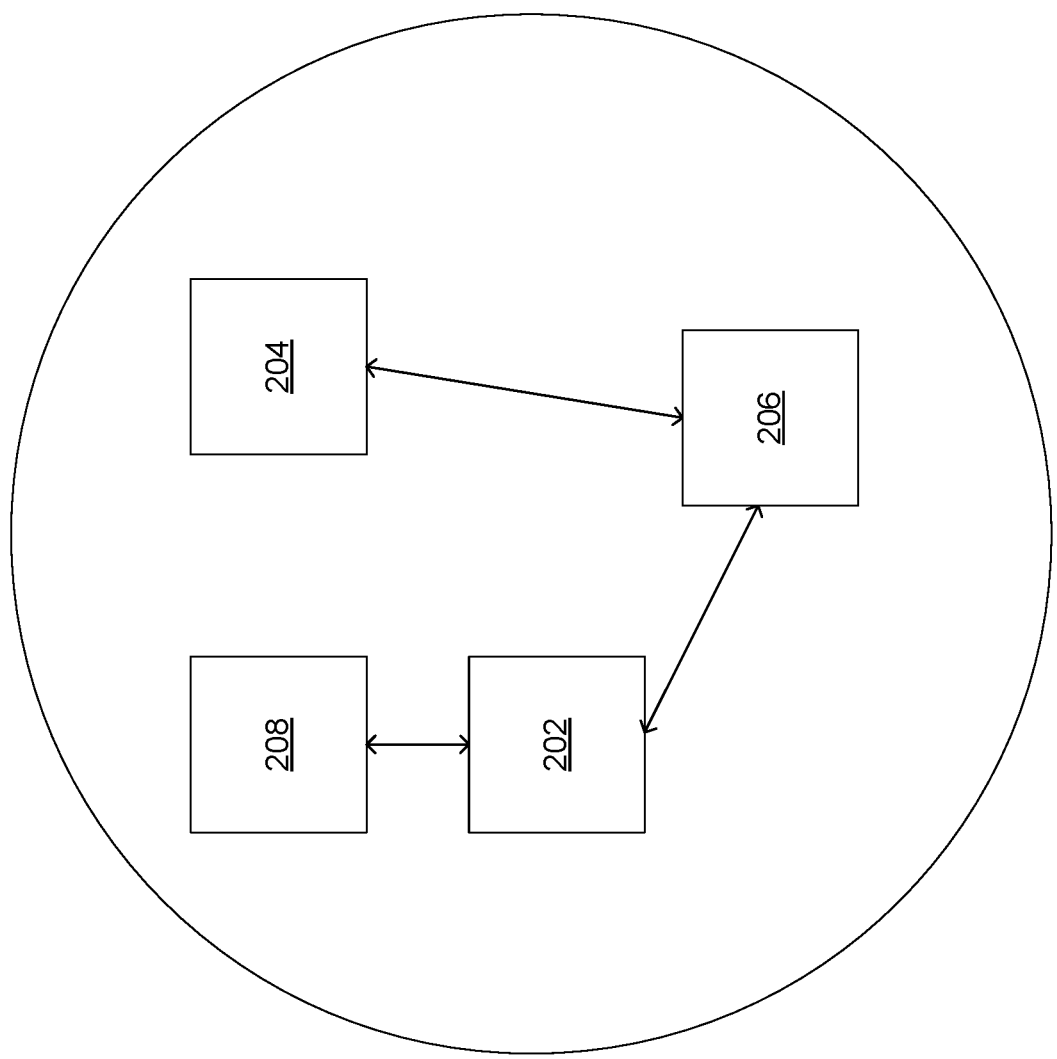
FIG. 2 illustrates an example smart space according to an embodiment.

FIG. 2 illustrates an example smart space 200 according to an embodiment. Smart space 102 may be an embodiment of the example smart space 200 illustrated in FIG. 2. As shown in FIG. 2, the example smart space 200 may include any of a plurality of devices 202, 204, 206, and 208. In other embodiments, smart space 200 may include more or fewer devices than shown in FIG. 2, including a single device, for example. Devices 202, 204, 206, and 208 may include any electronic device with processing and wireless communication capabilities, including mobile user devices, fixed user devices, routers, access points (APs), sensors, smart appliances, smart gadgets, etc.

Devices 202, 204, 206, and 208 may have equal roles (for example, may be equivalent nodes, similarly functioning nodes, and/or nodes with similar attributes) within smart space 200. Alternatively, one or more of devices 202, 204, 206, and 208 may be a central node, which may also be referred to as a management node, having an additional smart space setup/maintenance role. This additional smart space setup/maintenance role may be separate from any service (e.g., a user service) functionality provided by the device. For the purpose of illustration only, it is assumed hereinafter that device 202 is a central node of smart space 200.

When device 202 is a central node of smart space 200, device 202 may perform setup/maintenance functions for smart space 200. Setup/maintenance functions may include, among others, broadcasting a beacon (which may include a smart space identifier that identifies smart space 200) to announce availability of smart space 200, configuring parameters for communication (e.g., communication band(s), communication frequency(ies), transmit power level(s), random access parameters, sleep mode, etc.) within smart space 200, and/or controlling access to smart space 200. Access control functionalities of device 202 may include, among others, performing authentication and association/disassociation procedures to enable devices to join/leave smart space 200. In some embodiments, device 202, as the central node, may provide Internet access service to other member devices of smart space 200.

According to certain embodiments, devices 202, 204, 206, and 208 may communicate with each other via an air interface. The air interface may implement any known wireless communication protocol, such as IEEE 802.11, Bluetooth, Near Field Communications (NFC), 3GPP communications protocols, cellular communications protocols, for example. Communication within smart space 200 may include direct peer-to-peer communication, as shown between devices 204 and 206, or communication via the central node 202, as shown between devices 206 and 208 via device 202.

According to embodiments, communication between smart space devices may encompass a variety of functions. For example, device 204 may communicate with device 206 to retrieve data from device 206. The retrieved data may be used by device 204 to perform a specified function. For example, device 204 may include a smart weather station that retrieves a temperature reading from device 206, which may be and/or include a smart thermometer, for the purpose of processing and displaying the temperature reading on a display. In another example, device 202 may communicate with device 208 to instruct device 208 to perform a specified function. For example, device 202 may include a user device with a calendar application that instructs device 208, a smart calendar (e.g., affixed onto a wall), to display or remove an appointment.

Returning to FIG. 1, first and second user devices 104a and 104b may each include any known user device with wireless communication capability. As such, user devices 104a and 104b may include both fixed and mobile user devices. By way of example, user devices 104a and 104b may each include a user equipment (UE), a mobile station, a fixed or mobile subscriber unit, a pager, a cellular telephone, a personal digital assistant (PDA), a smartphone, a tablet, a laptop, a netbook, a personal computer, a wireless sensor, consumer electronics, and may be included in other devices, fixtures, and/or elements, such as appliances (for example, a refrigerator, a coffee machine, a stove, a vacuum, a fan, etc.) and/or home fixtures (for example, a mirror, a table, etc.) and the like. User devices 104a and 104b may also include multi-mode capabilities, including multiple transceivers for communicating with different wireless networks over different wireless links. For example, user device 104a may be configured to communicate with a base station (not shown in FIG. 1), e.g., using a cellular-based radio technology, and with smart space 102, e.g., using an IEEE 802 radio technology.

Figure 3:
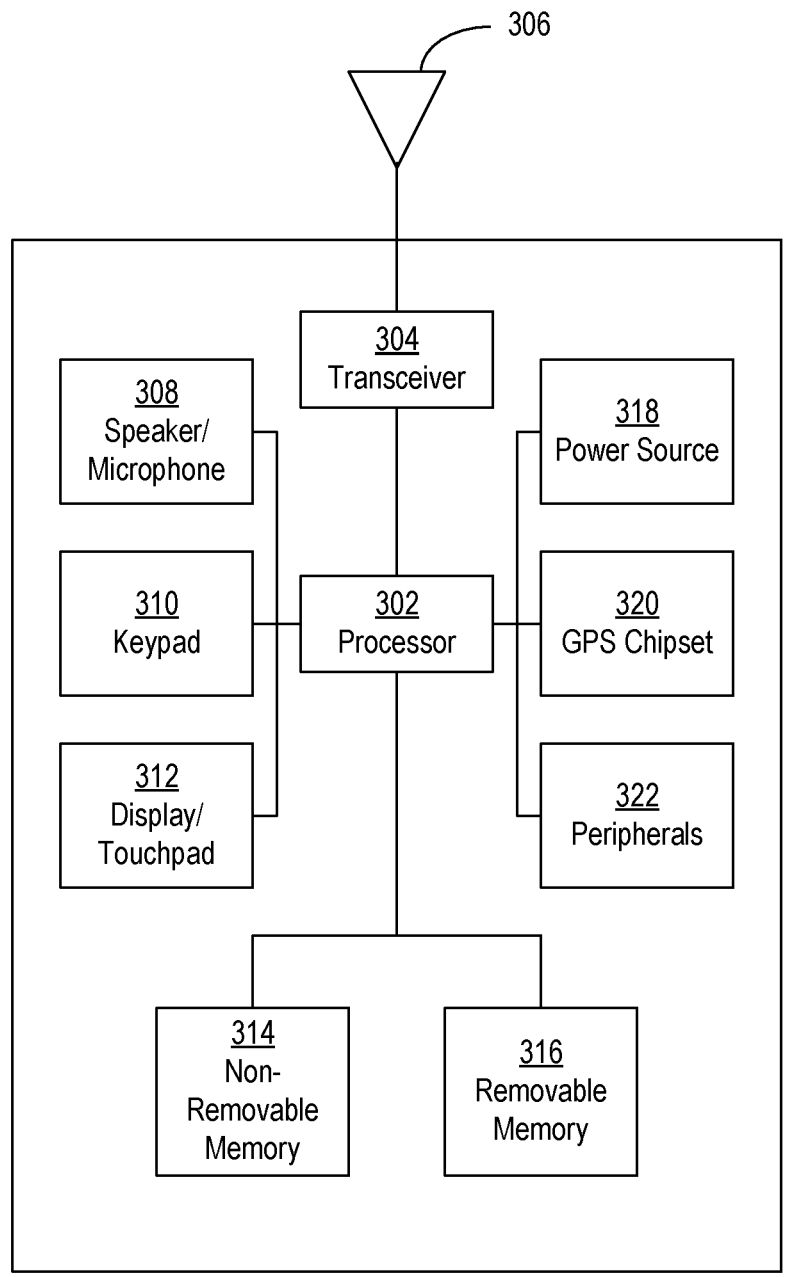
FIG. 3 illustrates an example apparatus according to an embodiment.

FIG. 3 illustrates an example apparatus 300 according to an embodiment. According to certain embodiments, user devices 104a and 104b may each be implemented like example apparatus 300 shown in FIG. 3. Example apparatus 300 is provided for the purpose of illustration only and is not limiting of embodiments of the present disclosure. As shown in FIG. 3, apparatus 300 may include a processor 302, a transceiver 304, a transmit/receive element 306, a speaker/microphone 308, a keypad 310, a display/touchpad 312, non-removable memory 314, removable memory 316, a power source 318, a global positioning system (GPS) chipset 320, and other peripherals 322. It will be appreciated that apparatus 300 may include any sub-combination of the foregoing elements while remaining consistent with an embodiment.

Processor 302 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. Processor 302 may perform signal coding, data processing, power control, input/output processing, and/or any other functionality that enables apparatus 300 to operate in a wireless/wired environment.

Processor 302 may be coupled to transceiver 304, which may be coupled to transmit/receive element 306. While FIG. 3 depicts processor 302 and transceiver 304 as separate components, it will be appreciated that processor 302 and transceiver 304 may be integrated together in an electronic package or chip.

Transmit/receive element 306 may be configured to transmit/receive signals over an air interface. For example, according to certain embodiments, transmit/receive element 306 may be an antenna configured to transmit and/or receive radio frequency (RF) signals. In other embodiments, transmit/receive element 306 may be an emitter/detector configured to transmit and/or receive infrared (IR), ultraviolet (UV), or visible light signals, for example. In yet other embodiments, transmit/receive element 306 may be configured to transmit and receive both RF and light signals. It will be appreciated that transmit/receive element 306 may be configured to transmit and/or receive any type, format, protocol, and/or combination of wireless signals.

In addition, although transmit/receive element 306 is depicted in FIG. 3 as a single element, apparatus 300 may include any number of transmit/receive elements 306. More specifically, apparatus 300 may employ MIMO technology. Thus, according to certain embodiments, apparatus 300 may include two or more transmit/receive elements 306 (e.g., multiple antennas) for transmitting and receiving wireless signals over the air interface.

Transceiver 304 may be configured to modulate the signals that are to be transmitted by transmit/receive element 306 and to demodulate the signals that are received by transmit/receive element 306. According to certain embodiments, apparatus 300 may have multi-mode capabilities. Thus, transceiver 304 may include multiple transceivers for enabling apparatus 300 to communicate via multiple radio access technologies (RATs), such as LTE and IEEE 802.11, for example.

Processor 302 may be coupled to, and may receive user input data from, speaker/microphone 308, keypad 310, and/or display/touchpad 312 (e.g., a liquid crystal display (LCD) display unit or organic light-emitting diode (OLED) display unit). Processor 302 may also output user data to speaker/microphone 308, keypad 310, and/or display/touchpad 312. In addition, processor 302 may access information from, and store data in, any type of suitable memory, such as non-removable memory 314 and/or removable memory 316. Non-removable memory 314 may include random-access memory (RAM), read-only memory (ROM), a hard disk, or any other type of memory storage device. Removable memory 316 may include a subscriber identity module (SIM) card, a memory stick, a secure digital (SD) memory card, and the like. According to certain embodiments, processor 302 may access information from, and store data in, memory that is not physically located on apparatus 300, such as on a server, a home computer, and/or on a device and/or element that may be accessed via a communications network.

According to certain embodiments, processor 302 may be configured to access and execute instructions stored in memory (e.g., non-removable memory 314, removable memory 316, etc.) to implement various functions at different layers of one or more protocol stacks. For example, processor 302 may be configured to implement data collection plug-ins 108 as in user device 104a or a security mechanism adaptation function 114 as in user device 104b. Data collection plug-ins 108 and security mechanism adaptation function 114 are further described below.

Processor 302 may receive power from power source 318, and may be configured to distribute and/or control the power to the other components in apparatus 300. Power source 318 may be any suitable device for powering apparatus 300. For example, power source 318 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

Processor 302 may also be coupled to GPS chipset 320, which may be configured to provide location information (e.g., longitude and latitude) regarding the current location of apparatus 300. Additionally or alternatively, apparatus 300 may receive location information over an air interface (e.g., from a base station) and/or determine its location based on the timing of the signals being received from two or more transmitters. It will be appreciated that apparatus 300 may acquire location information by way of any suitable location-determination method while remaining consistent with an embodiment.

Processor 302 may further be coupled to other peripherals 322, which may include one or more software and/or hardware modules that provide additional features, functionality and/or wired or wireless connectivity. For example, peripherals 322 may include a wired communication interface (e.g., coaxial cable transceiver, optical transceiver, etc.), an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Returning again to FIG. 1, smart space rating service 106 may include one or more servers for providing a rating service for smart spaces. Smart space rating service 106 may be a cloud-based service. According to certain embodiments, as described hereinafter, the rating service relates to security of smart spaces. However, as would be understood by a person of skill in the art based on the teachings herein, smart space rating may, additionally or alternatively, be provided based on other attributes of smart spaces.

According to embodiments, the one or more servers of smart space rating service 106 may each be implemented like example apparatus 300 of FIG. 3. The one or more servers may each include some, but not all, of the elements of example apparatus 300. According to certain embodiments, the one or more servers of smart space rating service 106 may be configured to, individually or collectively, implement a storage 110 and a rating calculator 112 to enable smart space rating service 106 as further described below.

In operation, embodiments enable a trustworthy smart space security rating service with distributed data collection. According to embodiments, this service may be provided via a smart space security information collection process, a smart space security information storage process, and a smart space security rating calculation process. For the purpose of illustration only, these processes are described below with reference to example environment 100 of FIG. 1. A person of skill in the art would appreciate, however, based on the teachings herein, that these processes can be readily practiced in other environments.

Figure 4:
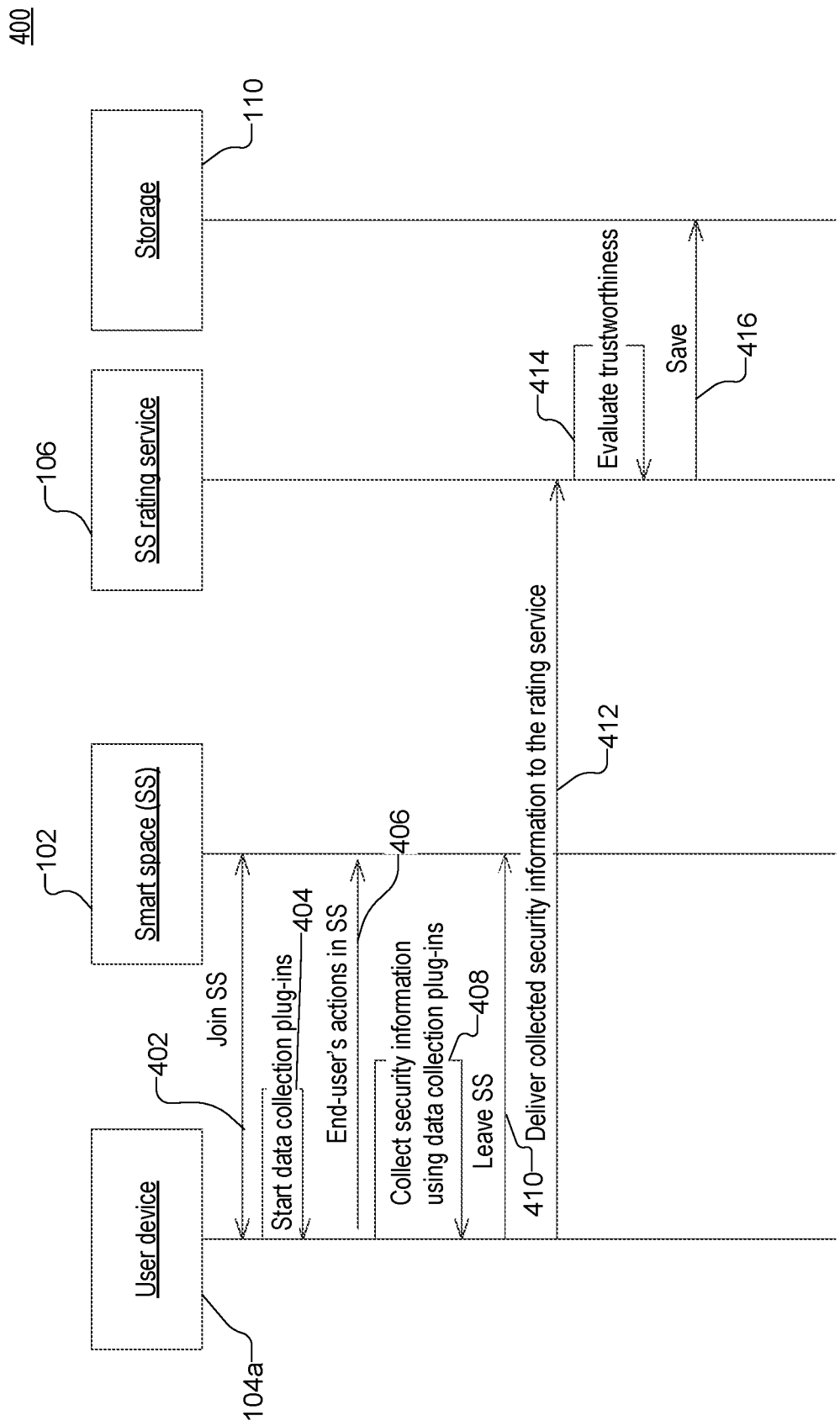
FIG. 4 illustrates an example process for smart space security information collection and storage according to an embodiment.

FIG. 4 illustrates an example process 400 for smart space security information collection and storage according to an embodiment. Example process 400 is provided for the purpose of illustration only and is not limiting. As shown in FIG. 4, at operation 402, user device 104a may join smart space 102. According to certain embodiments, operation 402 may include user device 104a communicating with a central node of smart space 102 to gain access to and become associated with smart space 102.

Upon joining smart space 102, at operation 404, user device 104a may start (e.g., initiate and/or execute) data collection plug-ins 108 to collect security related information (security information) from smart space 102. According to certain embodiments, data collection plug-ins 108 include network layer and application layer collection means. According to certain embodiments, data collection plug-ins 108 may include software scripts dedicated to collecting specific data. Data collection plug-ins 108 may be offered by smart space rating service 106 and thus can be trusted. However, the present disclosure is not limited thereto, and the data collection plug-ins 108 may be offered and/or received from any reliable, trustworthy, known, verified, etc., source. Table 1 below lists example attributes that data collection plug-ins 108 may collect from smart space 102. Table 1 is provided for the purpose of illustration only and not limitation.

TABLE 1

| Attribute | Comments | Data collection plug-ins |
|---|---|---|
| Software version of a software used by smart space | Is smart space using the latest software versions or out-dated and vulnerable versions? | Application layer: check (e.g. determine) what data base and web-service versions are utilized. Network layer: check (e.g., determine) the version number of communication protocol. |
| Supported security mechanisms | What security mechanisms does the smart space use, i.e., user authentication, communication encryption, etc.? | Application layer: What application level security mechanisms are used, e.g., for user authentication and how are passwords delivered. Network layer: How communication channel is protected, e.g., device authentication and message integrity. |
| Quality of service (QoS) associated with smart space | E.g., connection speed, bandwidth, etc. | Application layer: plug-in to observe service quality from the application viewpoint. Network layer: plug-in to observe communication quality. |
| Delays | Part of QoS. | Network layer: plug-in to observe communication delays. |
| Packet resend | How many data packets are lost and need resending? | Network layer: plug-in that calculates (e.g., determines) how many packets have to be resent. |
| Amount or type of anti-virus system (AVS) alerts generated due to use of smart space | Does the usage of smart space cause AVS alerts in a user device? If yes, what kind and when? | Application layer: plug-in that observes alerts raised by the AVS. |
| Amount of firewall alerts generated due to use of smart space | Does the usage of smart space cause additional connection attempts (recognized by a user device's firewall) | Application layer and/or network layer plug-in to observe incoming connections reported by firewall. |
| Smart space behavior | This is an upper level category containing attributes listed below. | N/A |

TABLE 1-continued

| Attribute | Comments | Data collection plug-ins |
|---|---|---|
| Amount of arriving packets | How much data does smart space send to user device? | Network layer: plug-in to observe the amount of arriving packets. |
| Amount and type of data queries that smart space performs | How much data queries does smart space perform and what kind of queries are they, e.g., does smart space ask for location or phone contacts? Does smart space try to collect personal data? | Application layer: plug-in to observe arriving data queries, especially queries that are responded automatically, i.e., user does not write or select response value. |
| Amount of queries other smart space devices send to user device | Does smart space restrict other devices from sending queries to the user device? | Same as above. |
| Targeted advertisement | Does smart space offer targeted advertisements? Targeted advertisements need user tracking. Now, the purpose is not to block ads (where techniques already exist, e.g., DNS manipulation). However, the purpose is to recognize ads that are targeted for the user based on previously collected data or user tracking. | Application layer: this plug-in needs more functionality than other ones. For instance, the plug-in can observe utilization of cookies. Or alternatively, plug-in analyses the content that user is consuming, and checks whether advertisement fields contain similar items/words. Network layer: monitoring traffic, i.e., does connections from user device to advertisement services exist. |
| Terms of usage | Does smart space require the acceptance of "terms of usage" document? If so, this document can be analyzed and applied in the rating process. | Application layer: plug-in to store the content from the "terms of usage" document as a plain text. |
| Terms of usage compliance | Does smart space behave as stated in the terms of usage? | Application layer: plug-in that gets the result of "terms of usage" document analysis from the smart space rating service, e.g., document states that all communication is encrypted. This plug-in compares these "commitments" to data from other plug-ins, e.g., data collected by Supported security mechanisms plug-in. |

Once associated with smart space 102, user device 104a may communicate with member devices of smart space 102 as illustrated by operation 406. For example, user device 104a may communicate with member devices to provide/receive one or more service (e.g., Internet access, wireless charging, information retrieval, display, etc.) and/or perform one or more actions within smart space 102. Concurrently with communication associated with operation 406, user device 104a may collect security information regarding smart space 102 (using data collection plug-ins 108) as illustrated by operation 408.

In operation 410, user device 104a may leave smart space 102. According to certain embodiments, operation 410 includes user device 104a terminating its association with smart space 102. According to certain embodiments, operation 410 includes user device 104a moving out of communication range from smart space 102 and losing its connection to smart space 102.

In operation 412, user device 104a may deliver the collected security information regarding smart space 102 to smart space rating service 106. According to embodiments, operation 412 may be performed via an application associated with data collection plug-ins 108. According to certain embodiments, the application may deliver the collected security information based on user settings in the application. The user settings may include, for example, settings relating to time or frequency of delivery of collected security information (e.g., periodically at a scheduled time, upon each smart space usage session, etc.), settings relating to user prompt/notification (e.g., whether user prompt and acceptance is required for delivery, whether user notification of delivery is desired, etc.), and settings relating to which RAT to use for delivery of the collected security information.

According to embodiments, operation 412 includes user device 104a logging in to smart space rating service 106. This may include user device 104a performing a registration process with smart space rating service 106 prior to or at the time of delivery of the collected security information. The registration process and the subsequent login in process ensure that the source of collected security information is known to smart space rating service 106. Additionally, the collected security information may be encrypted by user device 104a prior to delivery to ensure authenticity.

In operation 414, upon receiving the collected security information from user device 104a, smart space rating service 106 may evaluate the trustworthiness of the received information. Depending on the outcome of operation 414, in operation 416, smart rating service 106 may save the received information in storage 110. According to certain embodiments, where the security information from user device 104a is encrypted, operation 414 may include decrypting the security information and performing an integrity check on the decrypted security information. The decrypted security information may be stored in storage 110 on condition that the integrity check is successful.

Figure 5:
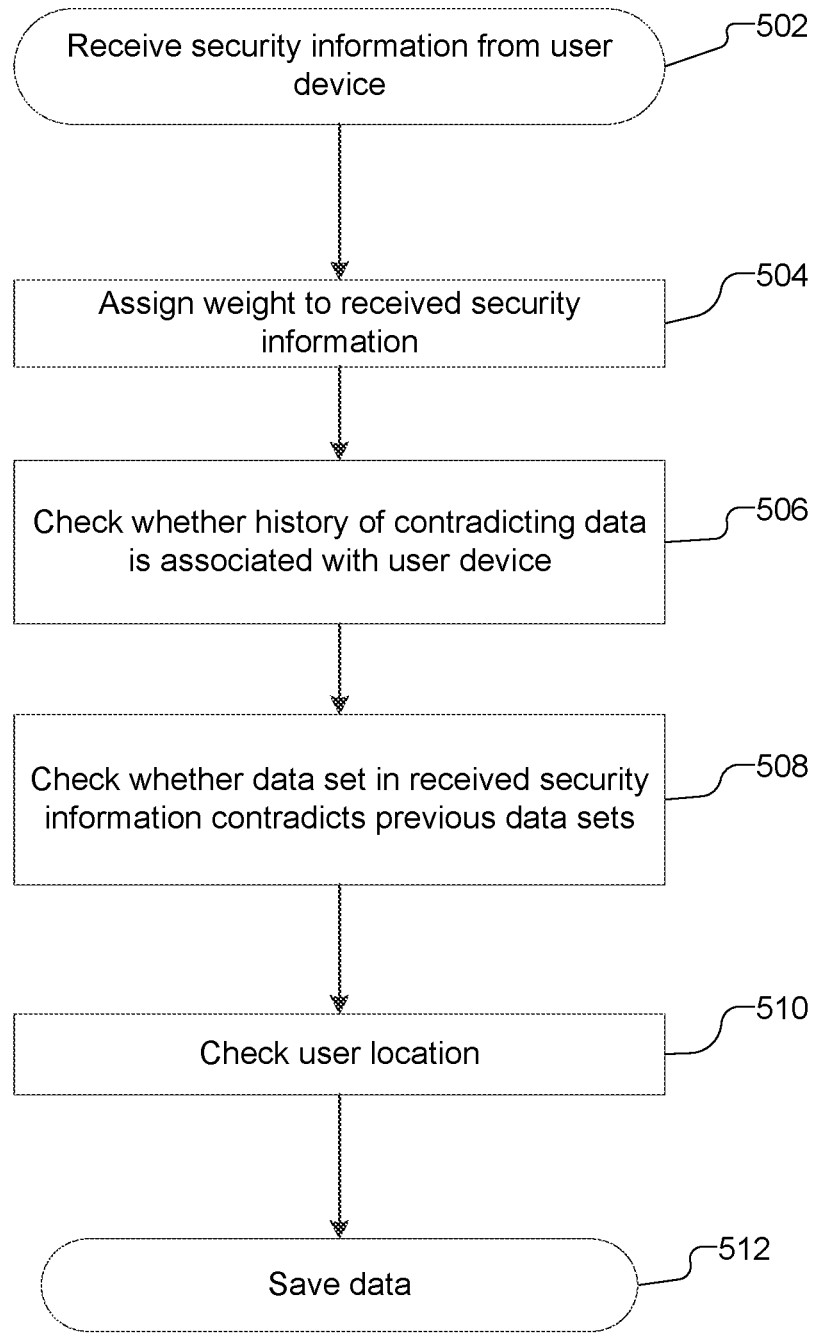
FIG. 5 illustrates an example process for evaluating trustworthiness of received smart space security information according to an embodiment.

FIG. 5 illustrates an example process 500 for evaluating trustworthiness of received smart space security information according to an embodiment. Example process 500 is provided for the purpose of illustration only and is not limiting of embodiments. Example process 500 may be performed by a smart space rating service, such as smart space rating service 106.

As shown in FIG. 5, at operation 502, security information may be received from a user device. According to embodiments, the security information from the user device may include security information regarding a smart space. The security information may be collected by means of data collection plug-ins and may include such data as described above, e.g., in Table 1.

Operation 504 includes assigning a weight to the received security information. According to certain embodiments, the weight may be based on an information provisioning history associated with the user device. For example, if the user device is a new user (i.e., that has never before provisioned security information to the smart space rating service), a weight of zero or a low value may be assigned to the received security information. In another example, security information received from a new user is only assigned a non-zero weight after a defined number of times (e.g., a defined number of times that security information is received from the user, a defined number of times the user uses a smart space, etc.). Alternatively, if the user device has a long history of provisioning security information to the smart space rating service, then a greater weight may be assigned to the received security information.

Operations 506, 508, and/or 510 may be performed subsequent to operation 504. Operations 506, 508, and 510 may include checking and/or determining various parameters that reflect, indicate, and/or are related to a trustworthiness level associated with the user device.

Specifically, operation 506 may include checking whether a history of contradicting data sets compared to other user devices is associated with the first user device. According to certain embodiments, a count, why may also be referred to as a weight, may be maintained for each user device indicating the number of times that the user device has provided data sets that contradict data sets from other user devices. As an example, the count may be at least partially a function of any one or more of the number of times the data set from the device differs from the relevant data sets received from other devices by more than a predetermined amount, how much the data set(s) differ from an average of the relevant data sets received from all devices (e.g., data sets relating to the same smart space), and the completeness of the data set relative to other data sets form other devices, or data sets received from the same device, the age of the relevant data sets received from other devices, etc. In some embodiments, different pieces of data within the data sets may be afforded different weights. According to certain embodiments, the count (e.g., the weight) is decayed over time, e.g., according to a pre-determined rate. In an embodiment, if the count (e.g., the weight) is above a pre-determined level, the received security information is discarded. Alternatively, the weight assigned to the security information may be lowered.

Operation 508 includes checking and/or determining whether a current data set contained in the received security information contradicts a previous data set received from the user device. For example, the current data set may indicate that a software version used by the smart space is older than a version reported previously by the same user device. According to certain embodiments, a contradicting current data set may be discarded in its entirety. Alternatively, only the contradicting data within the data set may be discarded. According to certain embodiments, the weight assigned to the security information may be lowered, for example, in when it is determined that the current data set contradicts a previous data set.

Operation 510 includes checking and/or determining whether a reported location of the user device contradicts a reported location of the smart space. This relies on the fact that in order to rate the smart space, the user device must be able to use the smart space and therefore be in proximity to a smart device, e.g., a smart device associated with the smart space on which the user device is reporting. According to certain embodiments, if the reported location of the user device contradicts a known location of the smart space, the received security information might be malicious or otherwise erroneous and may be discarded.

Process 500 may terminate at operation 512, which includes saving any data resulting from operations 506, 508, and 510, effectively storing and/or discarding security information based on a trustworthiness level associated with the user device.

Although not shown in FIG. 5, according to certain embodiments, a smart space rating service may perform any one or more of the operations of example process 500 for each of a plurality of users and/or user devices. According to certain embodiments, the security information may be based on data received from and/or information related to a plurality of users. For example, the smart space rating service may receive the above discussed information from respective ones of a plurality of users and/or user devices. In such a case, the smart space rating service may perform a variety of operations on the received information, such as, for example, generate an average, determine outlier data/information, filter data/information, rank data/information, etc., in order to generate security information, which may be saved according to operation 512. Furthermore, in such a case, although not shown, security information may be updated and/or modified based upon new and/or different information received from a user and/or user device and/or generated by the smart space rating service (e.g., an average of user information).

Figure 6:
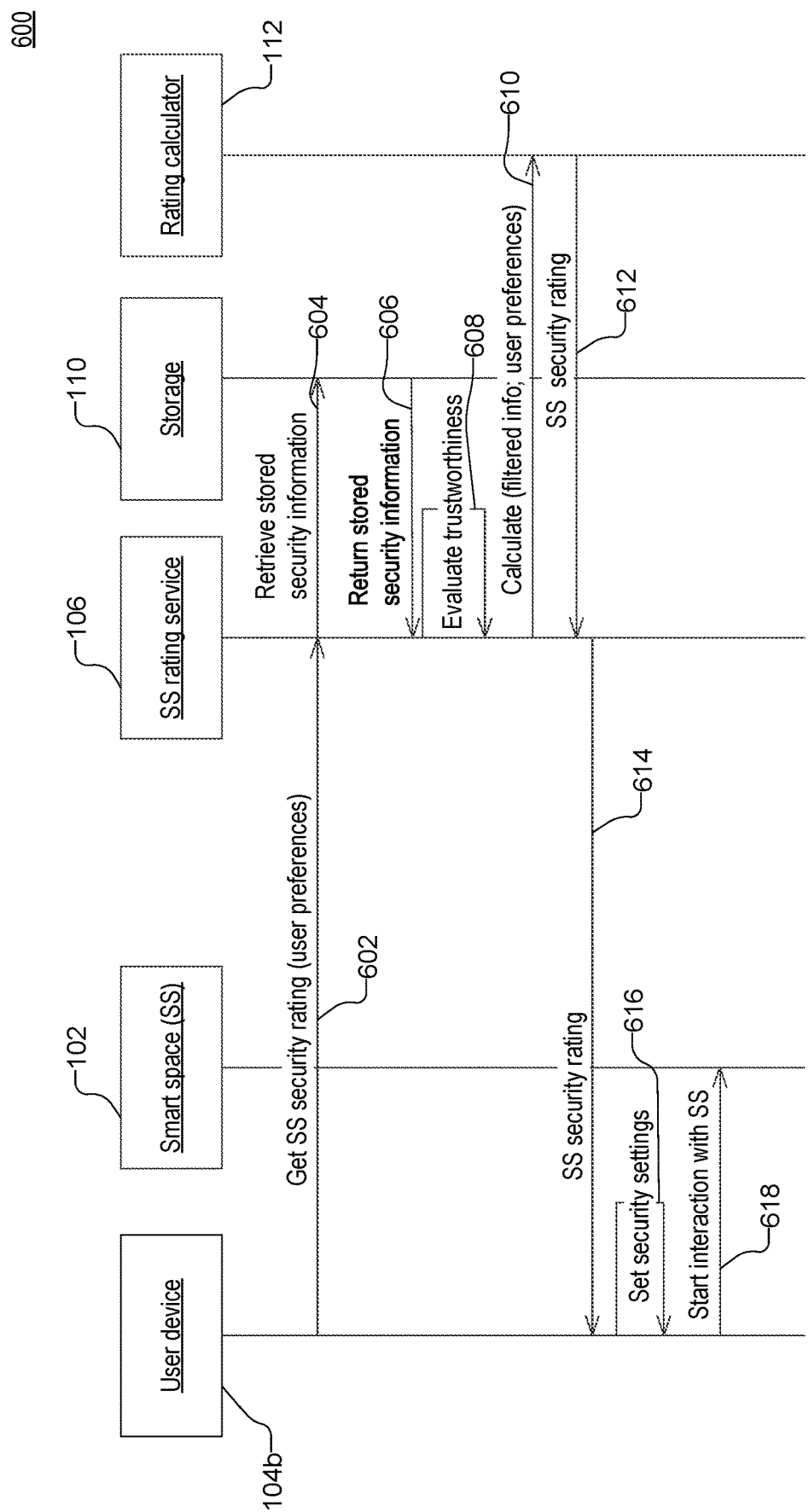
FIG. 6 illustrates an example process for requesting and providing a smart space security rating according to an embodiment.

FIG. 6 illustrates an example process 600 for requesting and providing a smart space security rating according to an embodiment. Example process 600 is provided for the purpose of illustration only and is not limiting. As shown in FIG. 6, at operation 602, user device 104*b* may request a security rating of smart space 102 from smart space rating service 106. According to certain embodiments, the request may include user preferences associated with user device 104*b*. According to certain embodiments, to avoid connecting to smart space 102 to send the request to smart space rating service 106, user device 104*b* may use an available cellular network and/or WiFi connection that is independent of smart space 102. This may be done while in proximity of smart space 102 or otherwise (e.g., a user may download the security rating of a smart space before arriving at the smart space location). According to certain embodiments, user device 104*b* may join smart space 102 with a highest level security settings (e.g., user device 104*b* may configure and/or operate with its own security settings at a highest level from among a plurality of security setting levels), use a connection provided by smart space 102 to send the request, and then adjust the security settings upon receiving the security rating of smart space 102.

Upon receiving the request for security rating from user device 104*b*, in operation 604, smart space rating service 106 may request any stored security information associated with smart space 102 from storage 110. In operation 606, storage 110 may provide the stored security information associated with smart space 102 to smart space rating service 106. In operation 608, smart space rating service 106 may compute (e.g., re-compute and/or reevaluate) the trustworthiness of the received security information to generate filtered security information. For example, the smart space rating service may perform any of the operations discussed above with respect to example process 500. According to certain embodiments, operation 608 may include filtering the stored security information to generate filtered security information regarding the smart space. For example, operation 608 may include filtering (e.g., filtering in/out) data sets (e.g., outlier data sets with best and worst data values), which may further include re-computing and/or reevaluating the trustworthiness of the received security information based on the filtered data set. Alternatively or additionally, operation 608 may include checking for and/or determining contradicting data sets within the stored security information. According to certain embodiments, contradicting data sets may be removed from the filtered security information, and the trustworthiness of the received security information may be determined without the contradicting data sets. According to certain embodiments, when two or more contradicting data sets exists, only the earliest or latest data set is kept. According to certain embodiments, the data set received from a user with the higher trustworthiness level is maintained in the filtered security information.

In operation 610, smart space rating service 106 may send a calculation request to rating calculator 112. According to certain embodiments, the calculation request may include some or all of the filtered security information associated with smart space 102 and the user preferences associated with user device 104*b*.

According to embodiments, rating calculator 112 may compute a security rating for smart space 102 based on the filtered security information and the user preferences associated with user device 104*b*. In operation 612, rating calculator 112 may send the computed security rating to smart space rating service 106, which forwards the security rating to user device 104*b* in operation 614.

Upon receiving the security rating from smart space rating service 106, if the security rating is acceptable, user device 104*b* may set security settings within user device 104*b* (e.g., using security mechanism adaptation function 114) according to the received security rating in operation 616. For example, user device 104*b* may enable ad-blocking and/or use anonymous browsing if the smart space offers advertisements. Alternatively, user device 104*b* may limit the types of activities that a user may perform within smart space 102. At operation 618, user device 104*b* may begin interacting with smart space 102. Alternatively, if the security rating is not acceptable, user device 104*b* may choose not to interact with smart space 102 and/or to interact with smart space 102 using the highest level security settings.

Figure 7:
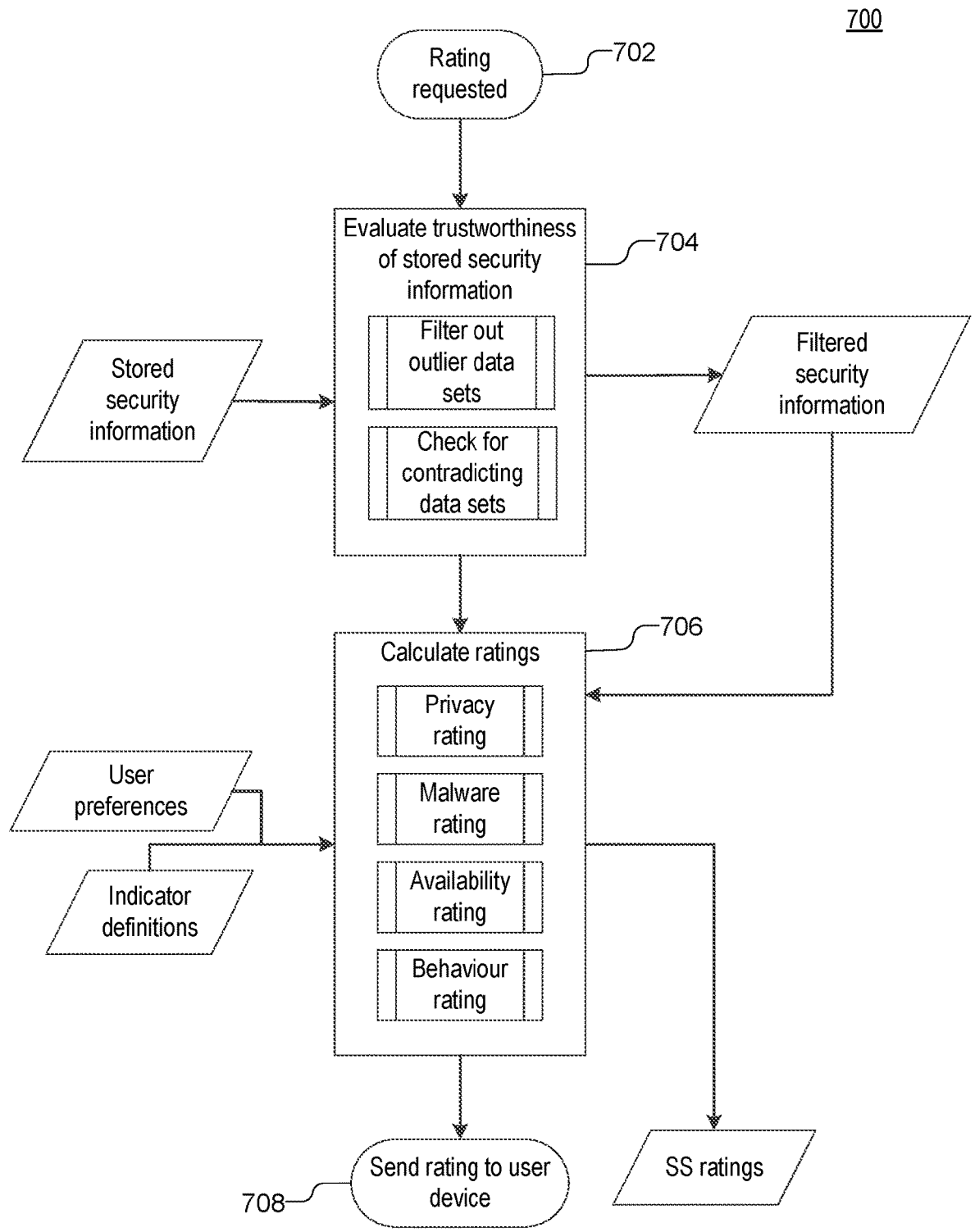
FIG. 7 illustrates an example process for generating a smart space rating according to an embodiment.

FIG. 7 illustrates an example process 700 for generating a smart space rating according to an embodiment. Example process 700 is provided for the purpose of illustration only and is not limiting of embodiments. Example process 700 may be performed by a smart space rating service, such as smart space rating service 106, for example. As shown in FIG. 7, operation 702 includes receiving a request for a security rating for a smart space. According to certain embodiments, a request is received from a user device, such as user device 104*b*, or any similar and/or suitable smart space network element, node, application, device, etc., that may request a security rating.

After retrieving the stored security information associated with the smart space being rated, operation 704 includes evaluating the trustworthiness of the stored security information. According to certain embodiments, operation 704 includes filtering the stored security information to generate filtered security information regarding the smart space. For example, operation 704 may include filtering (e.g., filtering in/out) data sets (e.g., outlier data sets with best and worst data values). Alternatively or additionally, operation 704 may include checking for and/or determining contradicting data sets within the stored security information. According to certain embodiments, contradicting data sets may be removed from the filtered security information. According to certain embodiments, when two or more contradicting data sets exists, only the earliest or latest data set is kept. According to certain embodiments, the data set received from a user with the higher trustworthiness level is maintained in the filtered security information.

Subsequently, operation 706 includes calculating (e.g., determining) the security rating of the smart space based on the filtered security information. In an embodiment, operation 706 includes calculating (e.g., determining) any of: a privacy rating, a malware rating, an availability rating, and a behavior rating of the smart space. These ratings may be calculated (e.g., determined) using various techniques, including defining rule sets for rating calculation, statistical methods, and/or data mining and analysis techniques.

According to embodiments, the security rating of the smart space may be calculated (e.g., determined) based on user preferences associated with the user device requesting the security rating. According to certain embodiments, this may include calculating (e.g., determining) an initial security rating of the smart space based on the filtered security information of the smart space, and adjusting the initial security rating of the smart space based on the user preferences associated with the user device to generate the security rating of the smart space. For example, the smart space rating service may compute a malware rating for the smart space based on stored security information. According to certain embodiments, depending on a user preference regarding malware (which may be a YES/NO answer in response to the question "is good malware performance required?"), the smart space rating service may adjust the malware rating down (if good malware performance is required) or keep it the same (if good malware performance is not required).

According to certain embodiments, calculating (e.g., determining) the security rating based on user preferences may include adjusting the security information regarding the smart space based on the user preferences, and may include calculating (e.g., determining) the security rating of the smart space based on the adjusted security information.

According to certain embodiments, the user preferences may be applied during the rating calculation. For example, if attributes A and B are used to calculate (e.g., determine) the malware rating of the smart space, then the user preferences may be used to directly affect attributes A and B. An example illustrating how attributes may be combined to calculate (e.g., determine) ratings is described further below.

According to certain embodiments, all smart space ratings may be combined and a user may be given the option to set only a few preferences. For example, the user may be allowed to select one or more statements that describe its preferences (e.g., "I prefer good privacy over connection speed," "I prefer free service over security," etc.). Combining various attributes makes it possible to provide the user an ordered list of smart spaces based on rating and user preferences. For example, the list may inform the user that "Smart space A matches all your preferences," "Smart space B matches all your preferences except preference X," or "Smart space C does not match your preferences." However, the present disclosure is not limited thereto, and the various attributes may be used and/or combined to provide the user a variety of information on smart spaces.

Returning to FIG. 7, after calculating (e.g., determining) the security rating of the smart space, operation 708 includes sending the security rating to the user device that made the request.

An example illustrating how a rating may be computed based on attributes is provided in Tables 2 and 3 below. This example is provided for the purpose of illustration only and is not limiting of embodiments. For the purpose of illustration, the rating being computed in this example is a malware rating, and the attributes, denoted by A and B, correspond respectively to the average amount of antivirus alerts and the delay from update release to update install.

As shown in Table 2, according to certain embodiments, an attribute rating may be generated for each of attributes A and B separately. In this example, the higher the rating number is, the better is the rating.

TABLE 2

| A = AVG[AVS alerts] | Rating based on A | B = Update delay | Rating based on B |
|---|---|---|---|
| >10% | 1 | >7 days | 1 |
| 3%-9.99% | 2 | 2-7 days | 2 |
| 0.5%-2.99% | 3 | 1-2 days | 3 |
| 0.49%-0.05% | 4 | <1 day | 4 |
| <0.05% | 5 | Up-to-date software in use. | 5 |

The attribute ratings may be combined into a malware rating as shown in Table 3.

TABLE 3

| Malware rating | Rule |
|---|---|
| 1 | IF A OR B == 1 |
| X | IF A AND B == X |
| 2 | IF ((A OR B == 4) AND (2 ≤ A OR B ≤ 3) |
| 3 | IF ((A OR B == 5) AND (3 ≤ A OR B ≤ 4) |
| 5 | IF A AND B == 5 |

User preferences may be used to adjust the calculated (e.g., determined) malware rating. For example, assuming that three levels of malware protection preferences are available (e.g., High, Medium, and Low), the malware rating may be adjusted down by one when High is selected. When Medium is selected, the malware rating may be unchanged. And when Low is selected, the malware rating may be increased by one.

Figure 8:
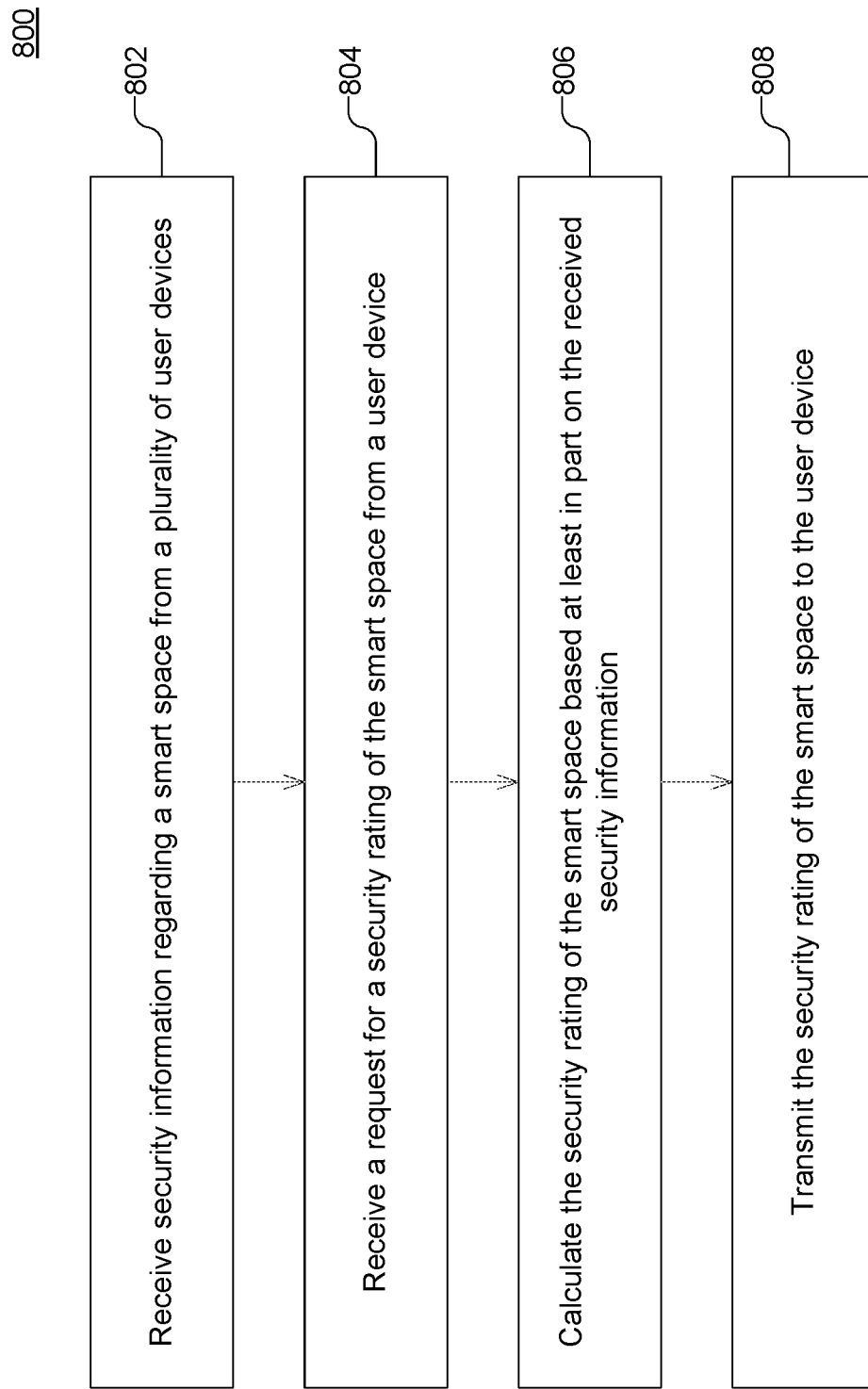
FIG. 8 illustrates an example process performed by a smart space rating server according to an embodiment.

FIG. 8 illustrates an example process 800 performed by a smart space rating server according to an embodiment. Example process 800 is provided for the purpose of illustration only and is not limiting of embodiments. Example process 800 may be performed by smart space rating service 106 for example. As shown in FIG. 8, operation 802 includes receiving security information regarding a smart space from a plurality of user devices. The security information from the plurality of user devices may be received each time that a user device uses the smart space and provides security information to the rating server. As such, the security information may be collected and stored over time, for example, by the smart space rating server. According to certain embodiments, operation 802 may include multiple receiving operations at different times from multiple user devices and also multiple receiving operations at different times from the same user device.

According to embodiments, such as those described above, the security information regarding the smart space may include any of: (a) a version of a software used by the smart space; (b) security mechanisms supported by the smart space; (c) a Quality of Service (QoS) associated with the smart space; (d) amount or type of antivirus system (AVS) alerts generated due to using the smart space; (e) amount of firewall alerts generated due to using the smart space; (f) amount or type of data queries received when using the smart space; (g) whether the smart space provides targeted advertisements; (h) terms of usage of the smart space; and (i) compliance level of the smart space with the terms of usage.

According to certain embodiments, where the security information regarding the smart space includes first security information received from a first user device of the plurality of user devices, process 800 may include any of: decrypting the first security information; performing an integrity check on the decrypted first security information; and storing the decrypted first security information on condition that the integrity check is successful.

In operation 804, process 800 includes receiving a request for a security rating of the smart space from a user device. According to certain embodiments, the request may identify the smart space using a smart space identifier and may include user preferences associated with the user device.

Operation 806 includes calculating (e.g., determining) the security rating of the smart space based at least in part on the received security information regarding the smart space. According to certain embodiments, operation 806 includes calculating (e.g., determining) any of: a privacy rating, a malware rating, an availability rating, and a behavior rating of the smart space. According to certain embodiments, operation 806 may include calculating (e.g., determining) the security rating of the smart space based on the user preferences associated with the user device. According to certain embodiments, this includes calculating (e.g., determining) an initial security rating of the smart space based on the security information regarding the smart space; and then adjusting the initial security rating of the smart space based on the user preferences associated with the user device to generate the security rating of the smart space. According to certain embodiments, this includes any of: adjusting the security information regarding the smart space based on the user preferences associated with the user device; and calculating (e.g., determining) the security rating of the smart space based on the adjusted security information.

Operation 808 includes transmitting the security rating of the smart space to the user device, which may operate as a termination of process 800.

Figure 9:
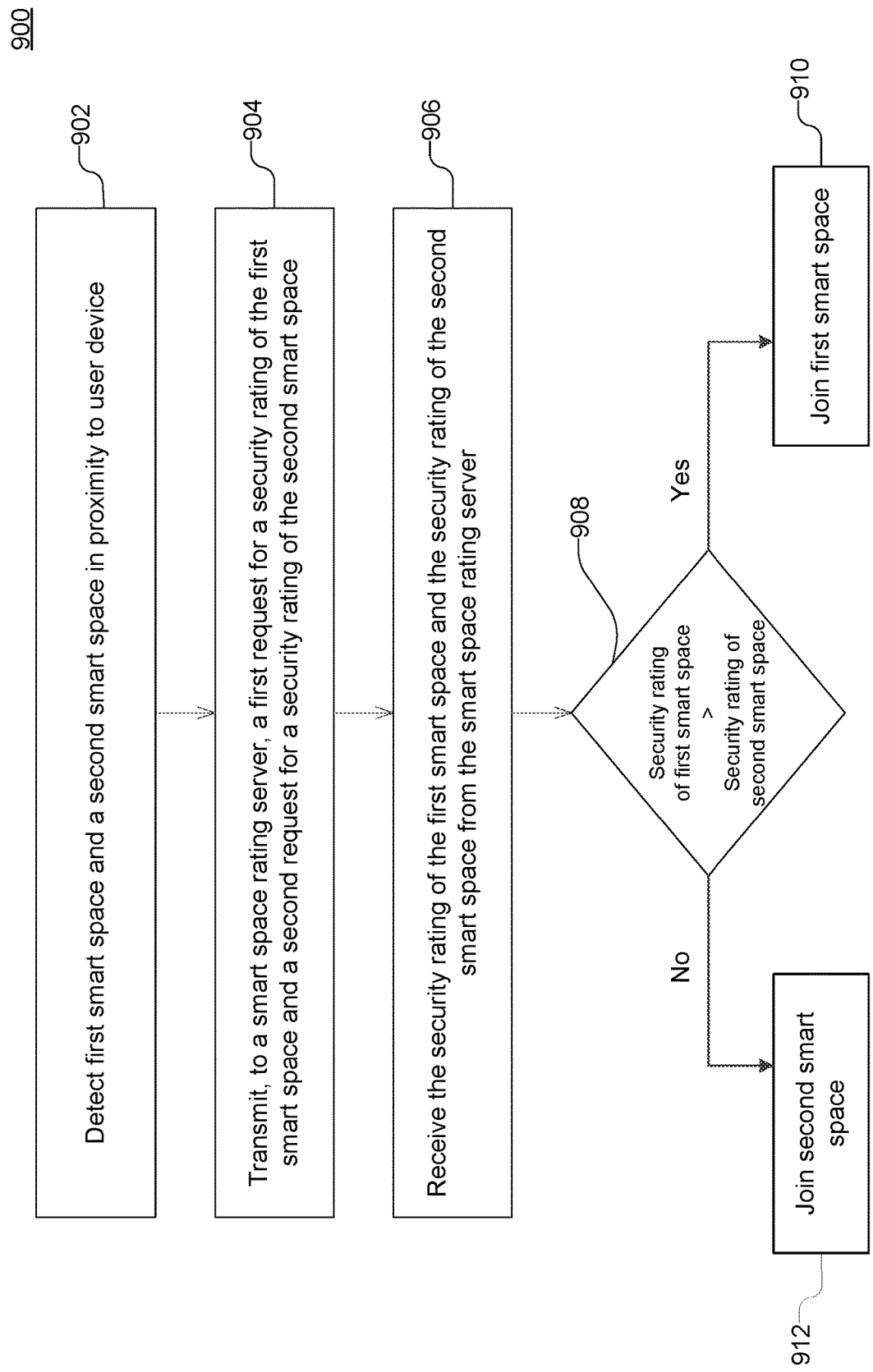
FIG. 9 illustrates an example process performed by a user device according to an embodiment.

FIG. 9 illustrates an example process 900 performed by a user device according to an embodiment. Example process 900 is provided for the purpose of illustration only and is not limiting of embodiments. Example process 900 may be performed by user device 104a or 104b, for example.

As shown in FIG. 9, operation 902 includes detecting a first smart space and a second smart space in proximity to the user device. According to certain embodiments, operation 902 may be performed via a first transceiver of the user device. For example, the first transceiver may be a WiFi transceiver. But other types of transceivers may also be used.

Operation 904 includes transmitting, to a smart space rating server, a first request for a first security rating of the first smart space and a second request for a second security rating of the second smart space. According to certain embodiments, the first and second requests include respectively first and second smart space identifiers associated respectively with the first smart space and the second smart space. According to certain embodiments, the first and second requests include user preferences associated with the user device. According to certain embodiments, the user preferences may be transmitted separately from the requests, or the user preferences may be saved a priori at the smart space rating server by the user device (e.g., by completing a profile with the smart space rating server).

Operation 906 includes receiving the first security rating and the second security rating from the smart space rating server. According to certain embodiments, any of operations 904 and 906 may be performed by a second transceiver of the user device, different from the first transceiver. For example, the second transceiver may be a cellular communication transceiver. Alternatively, the first transceiver and/or any other transceiver may be used for any of operations 904 and 906.

In operation 908, process 900 includes determining whether to join the first smart space and/or the second smart space, for example, based on a comparison of the first security rating and the second security rating. According to certain embodiments, if the first security rating of the first smart space is greater than the second security rating of the second smart space, process 800 proceeds to operation 910 which includes joining the first smart space. According to certain embodiments, process 800 proceeds to operation 912, which includes joining the second smart space. According to certain embodiments, prior to, during, and/or after joining one of the first or second smart spaces, the user device may adjust its security settings based on the security rating of the smart space being joined.

According to certain embodiments, such as those described above, after joining one of the first or second smart spaces, the user device may collect security information regarding the smart space, and may transmit the collected security information to the smart space rating server.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a device 202/204/206/208, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "user device", which may also refer to a "user equipment" and its abbreviation "UE" may mean (i) a wireless transmit and/or receive unit (WTRU), (ii) any of a number of embodiments of a WTRU, (iii) a wireless-capable and/or wired-capable (e.g., tetherable) device configured with, inter alia, some or all structures and functionality of a WTRU, (iii) a wireless-capable and/or wired-capable device configured with less than all structures and functionality of a WTRU, or (iv) the like. Details of an example WTRU, which may be representative of any user device recited herein, are provided below.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality.

In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

A processor in association with software may be used to implement a radio frequency transceiver for use in a user device, a smart space server, a wireless transmit receive unit (WTRU), user equipment (UE), terminal, base station, Mobility Management Entity (MME) or Evolved Packet Core (EPC), any processing device included in a smart space, or any host computer. The WTRU and/or user device may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method performed by a user device comprising:
    detecting, by the user device, a first smart space, wherein the first smart space comprises a first electronic device capable of instructing, via wireless communication, a second electronic device of the first smart space to perform a specified function;
    transmitting, by the user device to a smart space rating server, a first request for a first security rating of the first smart space and user preferences associated with the user device;
    receiving, by the user device, the first security rating from the smart space rating server, wherein the first security rating is based on the user preferences associated with the user device;
    determining, by the user device, whether to join the first smart space based on the first security rating;
    after the user device determines to join the first smart space, joining the first smart space through an association procedure performed by a management node of the first smart space via wireless communication, wherein the management node is a member device of the first smart space;
    wherein, upon joining the first smart space, the user device utilizes a data collection plug-in to collect security-related information from the first smart space and provide the collected security-related information to the smart space rating server, wherein the security-related information includes network layer security-related information and application layer security information, wherein the data collection plug-in is issued by a trustworthy source, wherein the security-related information collected by the user device with the data collection plug-in is considered trustworthy; and wherein the collected security-related information is utilized to update the first security rating; and
    after joining the first smart space, instructing, via wireless communication, the second electronic device to perform the specified function.

2. The method of claim 1, further comprising:
    adjusting security settings at the user device based on the first security rating; and
    joining, by the user device, the first smart space using the adjusted security settings.

3. The method of claim 1, further comprising:
    joining, by the user device, the first smart space;
    collecting, by the user device, security information regarding the first smart space; and
    transmitting the collected security information to the smart space rating server.

4. The method of claim 1, wherein the controlling includes at least one of controlling a function of another electronic device and retrieving data from another electronic device via the communication network.

5. The method of claim 1, further comprising, when the user device joins the first smart space, setting security settings within the user device according to the received first security rating.

6. The method of claim 5, wherein the security settings limit the types of activities that a user device may perform within smart space.

7. The method of claim 1, where the first request is transmitted to the smart space rating server via a wireless connection independent of the smart space.

8. The method of claim 1, wherein the security-related information collected by the user device includes:
    application layer security information including at least two of: application layer software version used by the first smart space, identification of security mechanisms utilized by the first smart space, quality of service of first smart space, antivirus system alerts, firewall alerts, amount and type of data queries that the first smart space performs, and targeted advertisements offered by first smart space, terms of usage of first smart space; and
    network layer security information including at least two of: device authentication and message integrity of the first smart space, communication delays in the first smart space, number of data packets resent to the user device by the first smart space, number of data packets arriving at the user device from the first smart space, and existence of advertisement services connections from first smart space to the user device.

9. The method of claim 1, wherein the smart space is a private network.

10. The method of claim 1, wherein the first smart space comprises a management node for the first smart space, further comprising:
    receiving information from the management node via a broadcast beacon that identifies and announces availability of the first smart space;
    performing authentication of the user device with the management node; and
    performing disassociation procedures with the management node to enable the user device to leave the first smart space.

11. The method of claim 3, wherein the collecting is automatically performed without human modification of the security information.

12. A method comprising:
    performing, by a smart space rating server via wireless communication, a registration process with a plurality of user devices prior to gathering security information collected by the plurality of user devices, wherein the plurality of user devices are members of a first smart space, wherein the first smart space comprises a first electronic device capable of instructing, via wireless communication, a second electronic device of the first smart space to perform a specified function;
    receiving, by the smart space rating server via wireless communication, the collected security information from the plurality of user devices, wherein the collected security information is related to electronic access security of the first smart space;
    wherein the security information collected by at least one of the plurality of user devices is collected utilizing a data collection plug-in that collects security-related information from the first smart space and provides the collected security-related information to the smart space rating server, wherein the security-related information includes network layer security-related information and application layer security information, wherein the data collection plug-in is issued by a trustworthy source, and wherein the security-related information collected by the user device with the data collection plug-in is considered trustworthy;

evaluating, by the smart space rating server, trustworthiness of the received collected security information to yield stored security information by:
  determining a trustworthiness level for the received collected security information based on which user device provided the received collected security information;
  storing or discarding the received collected security information based on the determined trustworthiness level, resulting in stored security information;
  identifying and removing contradicting security information within the stored security information;
receiving, by the smart space rating server via wireless communication, a request from a user device for a first security rating of the first smart space, wherein the first security rating of the first smart space relates to electronic access security of the first smart space;
in response to receiving the request for the first security rating, calculating the first security rating for the first smart space based at least in part on the stored security information for the first smart space; and
transmitting, by the smart space rating server, the first security rating of the first smart space to the user device via wireless communication.

13. The method of claim 12, wherein the collection of the security information by the plurality of user devices is automatically performed without human modification of the security information.

14. The method of claim 12, wherein the trustworthiness level associated with a given user device is based on any of:
  whether a history of contradicting data sets compared to user devices other than the given user device is associated with the given user device;
  whether a current data set contained in the security information contradicts a previous data set received from the given user device; and
  whether a reported location of the given user device contradicts a reported location of the first smart space.

15. The method of claim 12, further comprising assigning a weight to the stored security information based on information provisioning history associated with at least one of the plurality of user devices.

16. The method of claim 12, further comprising:
  filtering the stored security information regarding the smart space to generate filtered security information regarding the first smart space; and
  calculating the first security rating of the first smart space based on the filtered security information regarding the first smart space.

17. The method of claim 16, wherein filtering the stored security information comprises any of:
  removing outlier data sets from the stored security information; and
  removing contradicting data sets from the stored security information.

18. The method of claim 12, further comprising:
  decrypting the security information;
  performing an integrity check on the decrypted security information; and
  storing the decrypted security information on condition that the integrity check is successful.

19. The method of claim 12, wherein the security rating of the first smart space is calculated based on user preferences associated with the user device.

20. The method of claim 12, further comprising:
  calculating an initial security rating of the first smart space based on the stored security information regarding the first smart space; and
  adjust the initial security rating of the first smart space based on the user preferences associated with the user device to generate the first security rating of the smart space.

21. A smart space rating server comprising:
  a wireless transceiver;
  at least one processor; and
  at least one memory having stored instructions operative, when executed by the at least one processor, to cause the smart space rating server to:
    perform, by the smart space rating server via wireless communication, a registration process with a plurality of user devices prior to gathering security information collected by the plurality of user devices, wherein the plurality of user devices are members of a first smart space, wherein the first smart space comprises a first electronic device capable of instructing, via wireless communication, a second electronic device of the first smart space to perform a specified function;
    receive, by the smart space rating server via wireless communication, the collected security information from the plurality of user devices, wherein the collected security information is related to electronic access security of the first smart space;
    wherein the security information collected by at least one of the plurality of user devices is collected utilizing a data collection plug-in that collects security-related information from the first smart space and provides the collected security-related information to the smart space rating server, wherein the security-related information includes network layer security-related information and application layer security information, wherein the data collection plug-in is issued by a trustworthy source, and wherein the security-related information collected by the user device with the data collection plug-in is considered trustworthy;
    evaluate, by the smart space rating server, trustworthiness of the received collected security information to yield stored security information by:
      determining a trustworthiness level for the received collected security information based on which user device provided the received collected security information;
      storing or discarding the received collected security information based on the determined trustworthiness level, resulting in stored security information;
      identifying and removing contradicting security information within the stored security information;
    receive, by the smart space rating server via wireless communication, a request from a user device for a first security rating of the first smart space, wherein the first security rating of the first smart space relates to electronic access security of the first smart space;
    in response to receiving the request for the first security rating, calculate the first security rating for the first smart space based at least in part on the stored security information for the first smart space; and
    transmit, by the smart space rating server, the first security rating of the first smart space to the user device via wireless communication.

22. The smart space rating server of claim 21, wherein the instructions further cause the smart space rating server to assign a weight to the stored security information based on an information provisioning history associated with at least one of the plurality of user devices.

23. The smart space rating server of claim 21, wherein the trustworthiness level associated with a first user device is based at least in part on contradictory information provided by the first user device, including two or more of:
- a number of times contradicting data sets associated with the first user device contradict data sets from user devices other than the first user device;
- a number of times a data set from the first device differs by more than a predetermined amount from relevant data sets received from data sets from user devices other than the first user device;
- whether a current data set contained in the security information contradicts a previous data set received from the first user device;
- completeness of a data set from the first device relative to relevant data sets from user devices other than the first user device; and
- whether a reported location of the first user device contradicts a reported location of the first smart space.

24. The smart space rating server of claim 21, wherein the instructions further cause the smart space rating server to calculate the security rating of the smart space based on user preferences associated with the user device.

25. The smart space rating server of claim 21, wherein the data collection plug-in includes software scripts dedicated to collecting specific data.

26. The method of claim 1, wherein the data collection plug-in includes software scripts dedicated to collecting specific data.

27. The method of claim 12, wherein the data collection plug-in includes software scripts dedicated to collecting specific data.

* * * * *